US010513394B2

(12) United States Patent
Borders et al.

(10) Patent No.: US 10,513,394 B2
(45) Date of Patent: *Dec. 24, 2019

(54) METHOD OF USE OF A ROBOTIC FRAME AND POWER TRANSFER DEVICE

(71) Applicant: HDS Mercury, Inc., Palo Alto, CA (US)

(72) Inventors: Louis H. Borders, Palo Alto, CA (US); Aravind Durai, Palo Alto, CA (US)

(73) Assignee: HDS Mercury, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,347

(22) Filed: Aug. 28, 2018

(65) Prior Publication Data

US 2018/0362252 A1    Dec. 20, 2018

Related U.S. Application Data

(63) Continuation of application No. 15/446,958, filed on Mar. 1, 2017, now Pat. No. 10,065,798, and a continuation-in-part of application No. PCT/US2016/039010, filed on Jun. 23, 2016.

(60) Provisional application No. 62/302,070, filed on Mar. 1, 2016, provisional application No. 62/231,092, filed on Jun. 24, 2015.

(51) Int. Cl.
| B65G 1/06 | (2006.01) |
| B25J 5/00 | (2006.01) |
| B65G 65/00 | (2006.01) |
| B65G 67/02 | (2006.01) |
| B65G 1/04 | (2006.01) |
| B65G 67/22 | (2006.01) |
| B25J 9/16 | (2006.01) |

(52) U.S. Cl.
CPC .............. B65G 1/06 (2013.01); B25J 5/007 (2013.01); B65G 1/0421 (2013.01); B65G 1/0492 (2013.01); B65G 65/00 (2013.01); B65G 67/02 (2013.01); B65G 67/22 (2013.01); B25J 9/162 (2013.01); Y10S 901/01 (2013.01)

(58) Field of Classification Search
CPC ....................................... B65G 1/06
See application file for complete search history.

(56) References Cited

U.S. PATENT DOCUMENTS

| 3,127,791 A | 4/1964 | Roe |
| 3,439,765 A | 4/1969 | Keegan |
| 4,183,253 A | 1/1980 | Borello |
| 4,492,504 A * | 1/1985 | Hainsworth ............. B66F 9/07 414/273 |
| 4,508,484 A | 4/1985 | Heiz |
| 4,746,258 A | 5/1988 | Loomer |
| 4,818,171 A | 4/1989 | Burkholder |
| 5,361,481 A * | 11/1994 | Lloyd ................. B65G 1/0407 29/407.01 |

(Continued)

*Primary Examiner* — Thomas Randazzo
(74) *Attorney, Agent, or Firm* — Cherskov Flaynik & Gurda, LLC

(57) ABSTRACT

A method for movement of products is described. The method uses a facility which contains warehouse shelves, each shelf has a front, at least one moveable frame which travels to each shelf front to access the containers stored on each shelf. The moveable frame includes a repositionable storage ledge, a lifting device, and a gripping device. Mobile Robots exchange payloads between moveable frames.

20 Claims, 18 Drawing Sheets

(56) References Cited

U.S. PATENT DOCUMENTS

| | | | | |
|---|---|---|---|---|
| 5,397,211 A | * | 3/1995 | Lloyd | B65G 1/0407 |
| | | | | 104/246 |
| 7,261,511 B2 | | 8/2007 | Felder | |
| 7,329,081 B2 | * | 2/2008 | Baker | B65G 1/04 |
| | | | | 414/268 |
| 8,128,064 B2 | | 3/2012 | Franzen | |
| 8,639,382 B1 | | 1/2014 | Clark | |
| 8,948,914 B2 | | 2/2015 | Zini | |
| 9,056,719 B2 | * | 6/2015 | Tanahashi | B65G 1/0421 |
| 9,156,614 B2 | * | 10/2015 | Ono | H02B 3/00 |
| 9,637,318 B2 | * | 5/2017 | Messina | B65G 41/008 |
| 10,065,798 B2 | * | 9/2018 | Borders | B65G 65/00 |
| 2009/0162176 A1 | * | 6/2009 | Link | B65G 1/0421 |
| | | | | 414/659 |
| 2013/0149080 A1 | * | 6/2013 | Martin De Pablo | |
| | | | | B65G 1/0421 |
| | | | | 414/281 |
| 2013/0209203 A1 | * | 8/2013 | Rafols | B65G 1/0407 |
| | | | | 414/279 |
| 2015/0291356 A1 | * | 10/2015 | Oki | B65G 1/0407 |
| | | | | 414/273 |
| 2016/0272421 A1 | * | 9/2016 | Hognaland | B65G 1/0464 |
| 2016/0347544 A1 | * | 12/2016 | Kvifte | E06C 7/12 |
| 2017/0203921 A1 | * | 7/2017 | Issing | B65G 1/0407 |
| 2017/0225890 A1 | * | 8/2017 | Li | B65G 1/023 |

\* cited by examiner

16

- I-Beam connected to rack on one side (clearance for the top of stack gantry)
- Two cam followers on either side of RoboFrame to connect to the I-beam on either side (this allows having a rack only on one side)

METHOD OF USE OF A ROBOTIC FRAME AND POWER TRANSFER DEVICE

PRIORITY CLAIM

This application claims priority as a continuation to U.S. application Ser. No. 15/446,958 filed on Mar. 1, 2017, presently pending which in turn claimed priority to a U.S. Provisional Application Ser. No. 62/302,070, filed on Mar. 1, 2016, presently expired. application Ser. No. 15/446,958 also claimed priority as a continuation in part of PCT application PCT/US2016/039010, filed on Jun. 23, 2016, presently expired, which in turn claimed priority to U.S. provisional application Ser. No. 62/231,092, filed on Jun. 24, 2015, presently expired, and U.S. provisional application Ser. No. 62/302,070, filed on Mar. 1, 2016, presently expired. The contents of each application are hereby incorporated by reference.

BACKGROUND OF THE INVENTION

1. Field of the Invention

The field of the invention is a system for automation of a warehouse employing a mobile robotic frame and a power transfer system. The combination comprises an improved automated storage and retrieval system.

2. Background of the Invention

In various embodiments, the invention provides a solution for automating a storage location which includes non-powered shelves. The storage location can be any job site with an inventory, such as a fulfillment center, a warehouse, or a distribution center.

In one embodiment, the invention comprises a mobile robot, which moves containers from one or more mobile frames. The frames include lifting devices and gripping devices to move containers to and from warehouse shelves. Each shelf includes a passive container movement system which is actuated by a robotic arm attached to the mobile frame. The robotic arm works in cooperation with a gripping device, also located on the mobile frame.

Traditionally, warehouse automation systems required large mobile robotic components which could not be deployed even if the initial warehouse design or infrastructure did not account for robotic components.

A need exists in the art for a system that allows for adding of a relatively low-cost robotic solution to a warehouse having passive shelving units.

SUMMARY OF INVENTION

An object of the invention is to create a system for automating a warehouse. A feature of the invention is that the lifting device from the moveable frames retrieves needed containers from warehouse shelves and makes them available to a mobile robot for processing. An advantage of the system is that it allows for automated deliveries within a warehouse setting without custom-built infrastructure within the warehouse.

A further object of the invention is to automate a warehouse without adding powered movement mechanisms to each shelf. A feature of the invention is that the lifting device which is included on the moveable frame includes a shelf power transfer unit which actuates a shelf movement mechanism. An advantage of the invention is that it allows for automation of a warehouse without adding complexity and power systems to each shelf. A system for automated management of a high density warehouse comprising: warehouse shelves having multiple containers containing products stored thereon, wherein each shelf comprises a container movement mechanism; an autonomous mobile robot; and a lifting frame having one or more floor supports, vertical members, at least one horizontal crossbar, one or more storage ledges intermediate said floor supports and said at least one horizontal crossbar, further said lifting frame having a gripping device suspended from said at least one crossbar wherein said frame gripping device comprises a gantry arm wherein said gantry arm receives containers from the autonomous mobile robot to place on one or more frame ledges, wherein said gantry arm returns containers to the autonomous mobile robot from one or more frame ledges, and a lifting device attached to at least one vertical member, wherein said lifting device comprises an articulated arm having at least container placement tool wherein said lifting device transfers containers from one or more frame storage ledges to and from one or more warehouse shelves.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
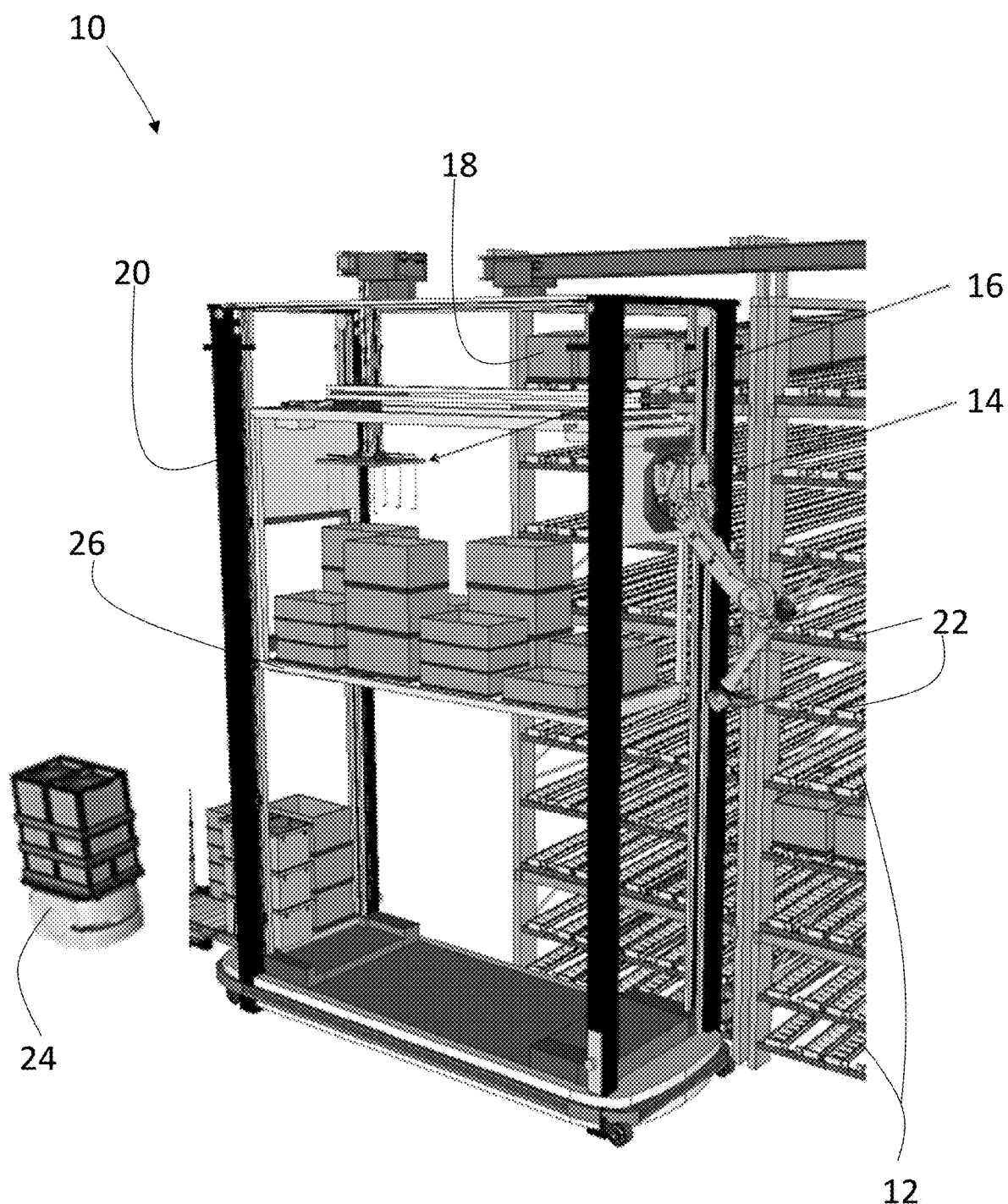
FIG. 1 depicts an overview of the system pursuant to one embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1, depicted therein is an overview 10 of the invented system. The system comprises a series of warehouse shelves 12, each shelf having a shelf front 22. Containers 18 of products are stored on each shelf. To access the containers 18, a moveable frame 20 approaches the shelf fronts 22. The moveable frame 20 includes a lifting device 14, such as the robotic arm shown in FIG. 1. The moveable frame 20 also includes a gripping device 16, capable of moving in any direction within the moveable frame 20. The moveable frame 20 includes a storage ledge 26.

In use, the moveable frame 20 approaches a bank of shelves 12. The ledge 26 moves into the required position to match the height of the shelf front 22. The lifting device 14 retrieves containers from the ledge 26 and places them on the shelf 12. While the lifting device 14 is placing containers, the gripping device 16 is arranging containers on the ledge 26 to allow the lifting device 14 to place containers 18. Once all containers are placed or retrieved form the shelf 12, the ledge 26 lowers and the containers 18 are retrieved by the mobile robot 24. The moveable frame 20 thereafter moves to a different bank of shelves.

Figure 2:
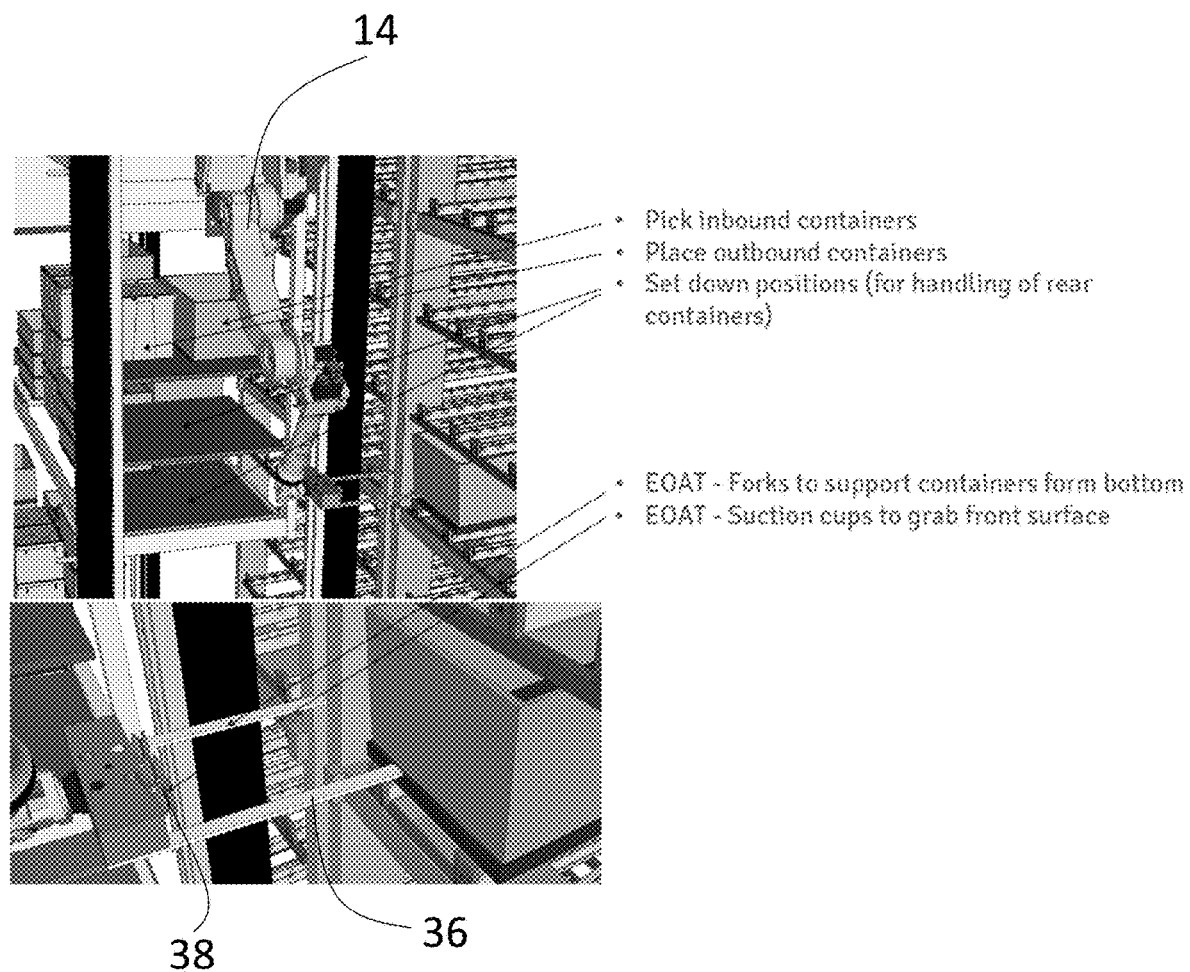
FIG. 2 depicts an overview of an embodiment of an end of arm tool pursuant to one embodiment of the invention.
Figure 3:
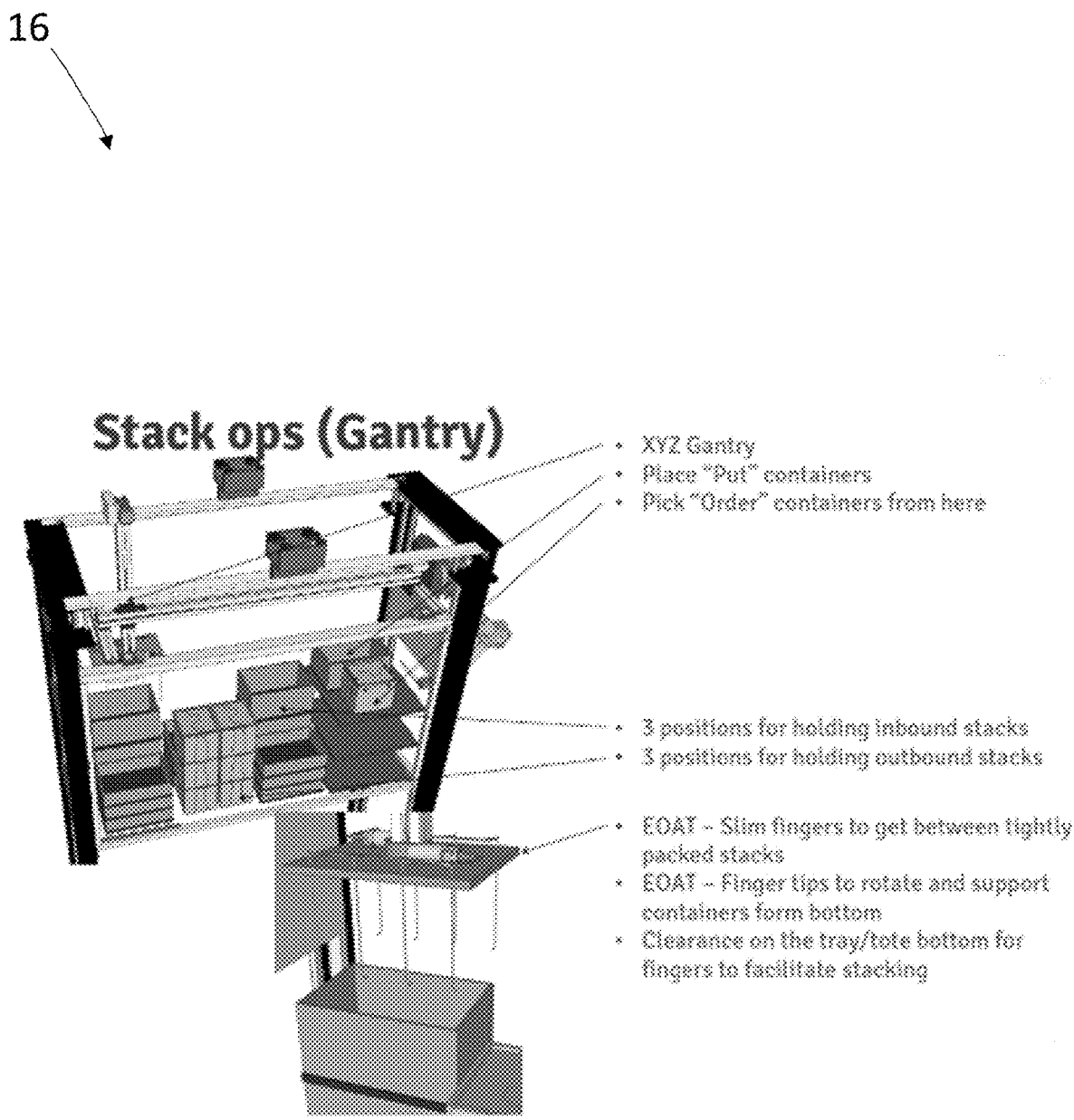
FIG. 3 depicts an overview of a gripping device pursuant to an embodiment of the invention.
Figure 4:
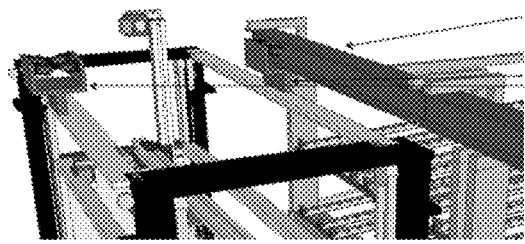
FIG. 4 depicts a detailed view of an embodiment of the transmission point of an invention.
Figure 5:
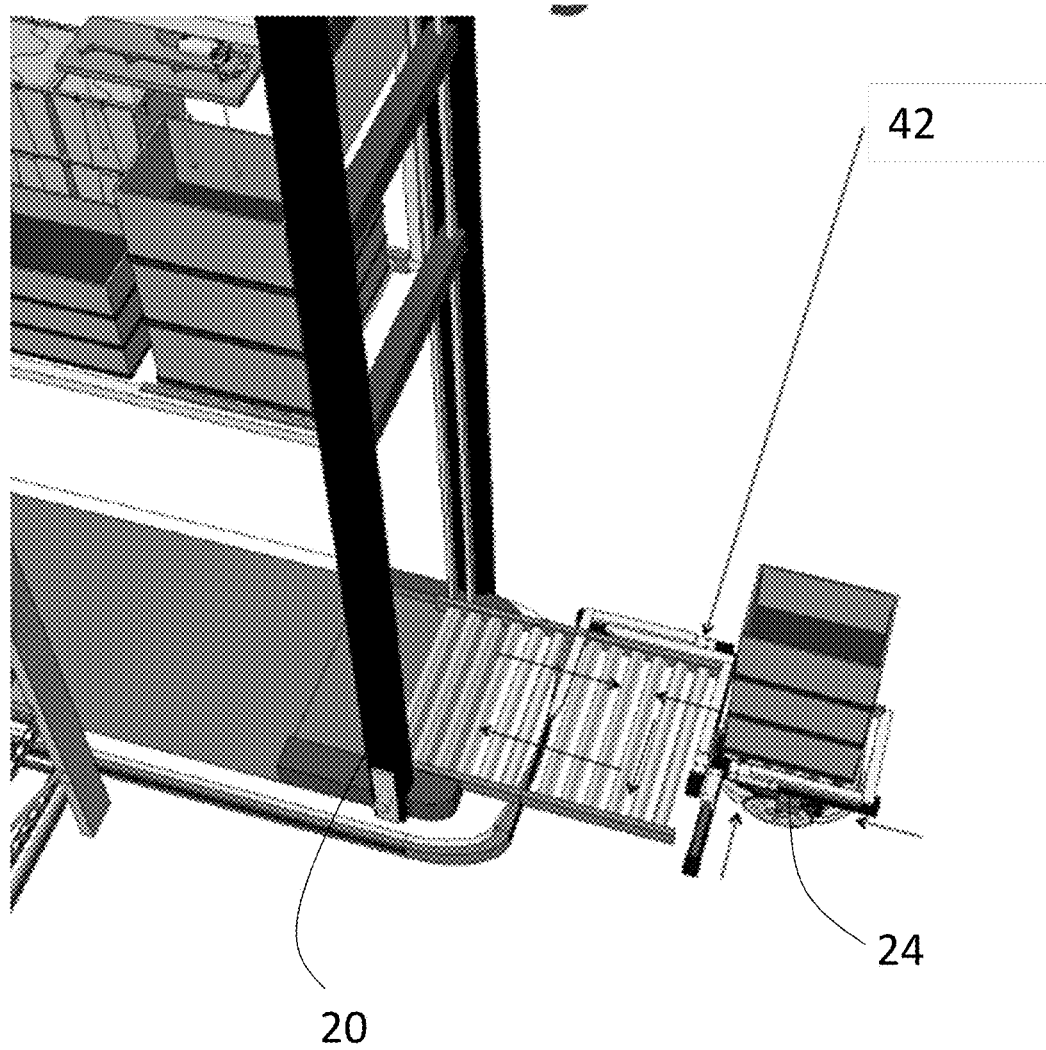
FIG. 5 depicts an overview of a product loading point pursuant to one embodiment of the invention.

As shown in FIG. 2, the lifting device 14 includes an end of arm tool (EOAT) which allows the lifting device 14 to interact with containers 18. The end of arm tool in FIG. 2 comprises forks 36 and suction cups 38. The details of the operation of the gripping device 16 are shown in FIG. 3, while details of the top of the shelf rack are shown in FIG. 4. FIG. 5 shows the exchange point 42 between the mobile robot 24 and the mobile frame 20.

Figure 6A:
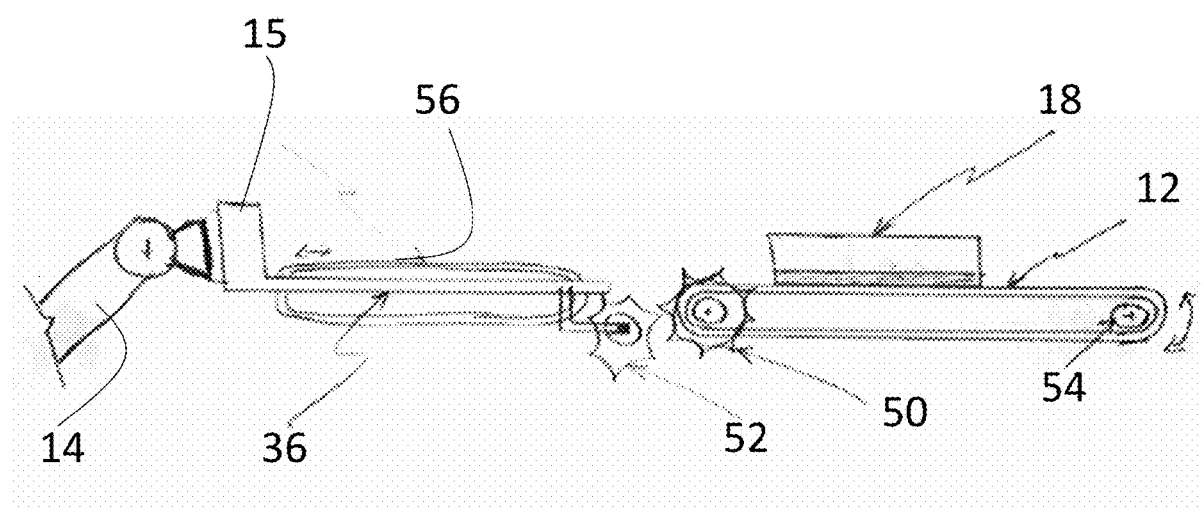
FIGS. 6A-D depict an overview of power transfer alternatives pursuant one embodiment of the invention.

Turning to the shelf power transfer options, as shown in FIGS. 6A-D, containers 18 move along the shelf 12 using a mechanism. As shown in FIG. 6A, the mechanism comprises a shelf sprocket 50 which is driven by a lifting device 14 end of arm tool sprocket 52. The shelf 12 mechanism also includes a pulley 54. By moving its sprocket 52, the lifting device 14, which includes an end of arm tool 15, can move the containers 18 on the shelf 12, even though the shelf does not include any autonomous power. Products from the end of arm tool belt 56 are transferred to the shelf 12. The belt 56 is supported by the forks 36. As can be seen in FIG. 6A, the shelf 12 is substantially parallel to the floor of the warehouse.

Figure 6B:
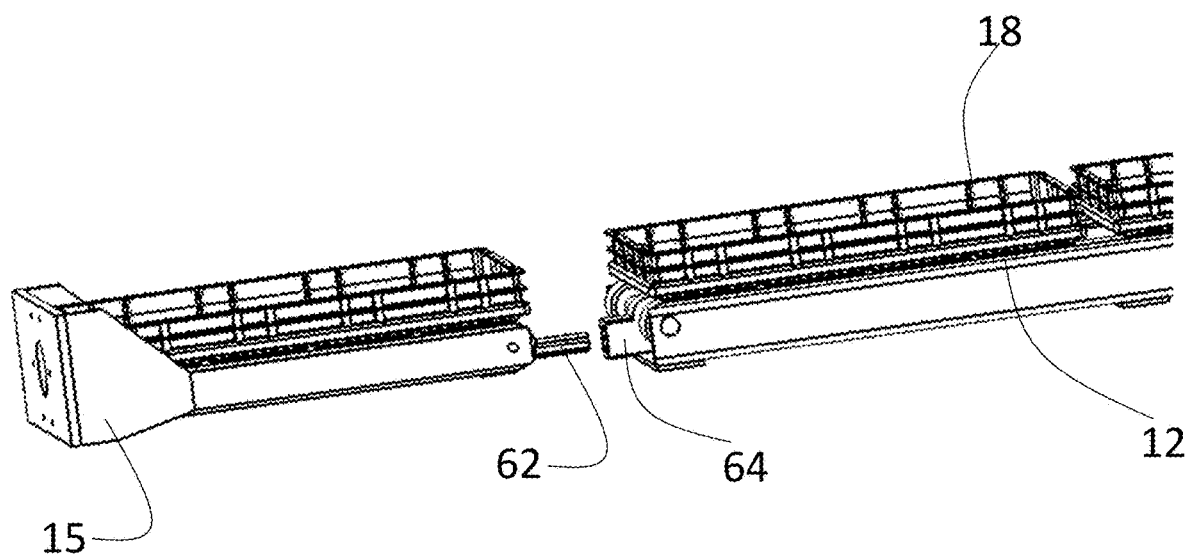
Figure 6C:
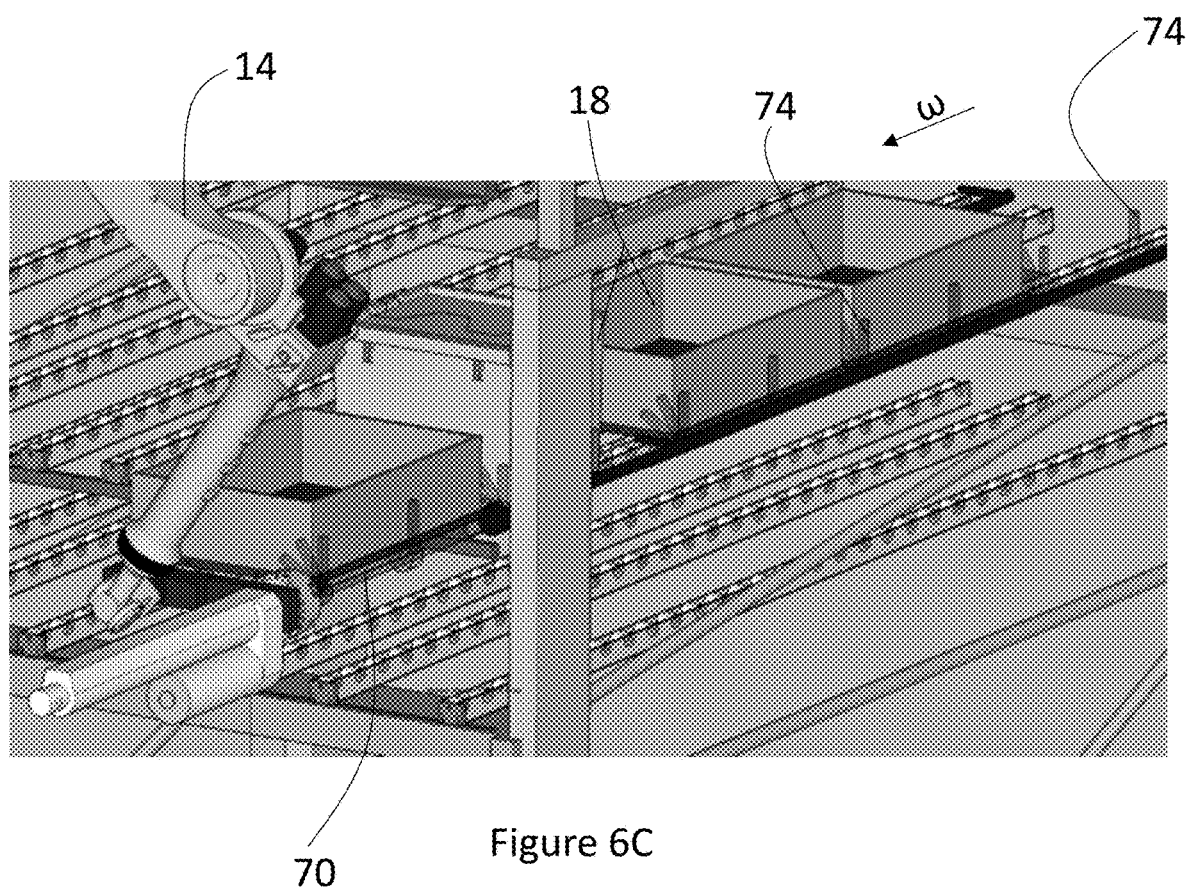

In the alternative design shown in FIG. 6C, the lifting device 14 includes a moveable rod 70 which includes one or more fingers 74. The rod 70 is rotated in place and fingers 74 are moved in place such that when the rod 70 is moved in the direction w product containers 18 move in the direction ω.

Figure 6D:
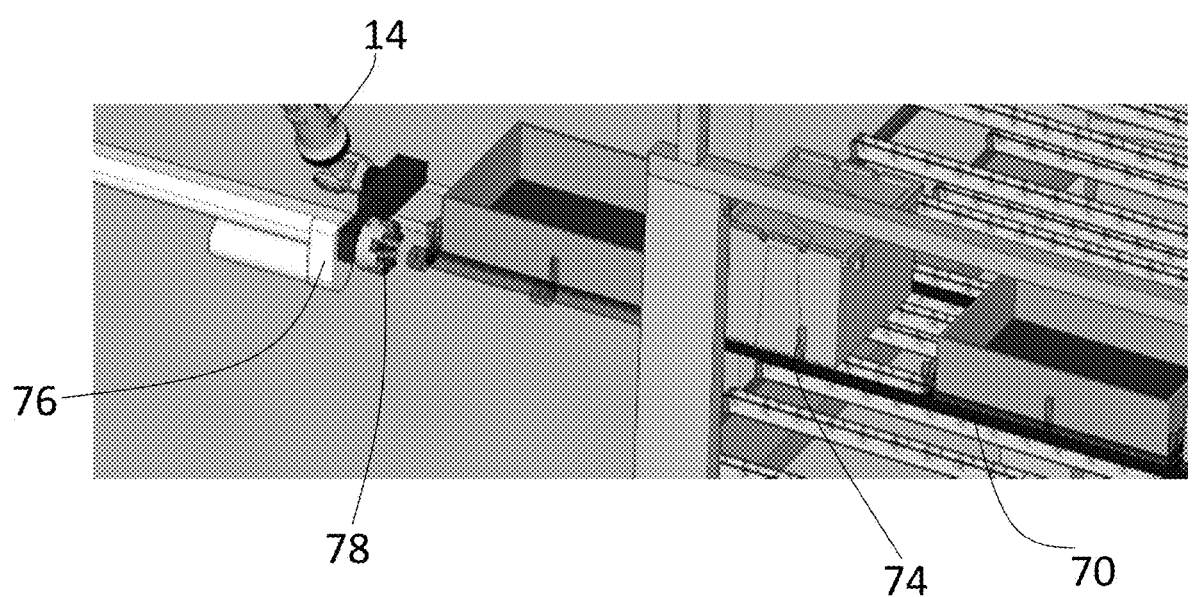

An alternative embodiment of the shelf 12 power transfer mechanism is shown in FIG. 6B. The mechanism comprises a lifting device end of arm tool 15 which includes a powered rotating shank 62 having an irregular cross-section. The shank 62 is removably received by the shelf actuator 64, such that rotational motion of the shank 62 is translated into lateral motion of the shelf 12 resulting in movement of the containers 18. As shown in FIG. 6D, the lifting device 14 product placement tool includes a rod controller 76 having selective appendage activator 78. In one embodiment, the appendage activator 78 comprises gripper fingers.

Figure 7A:
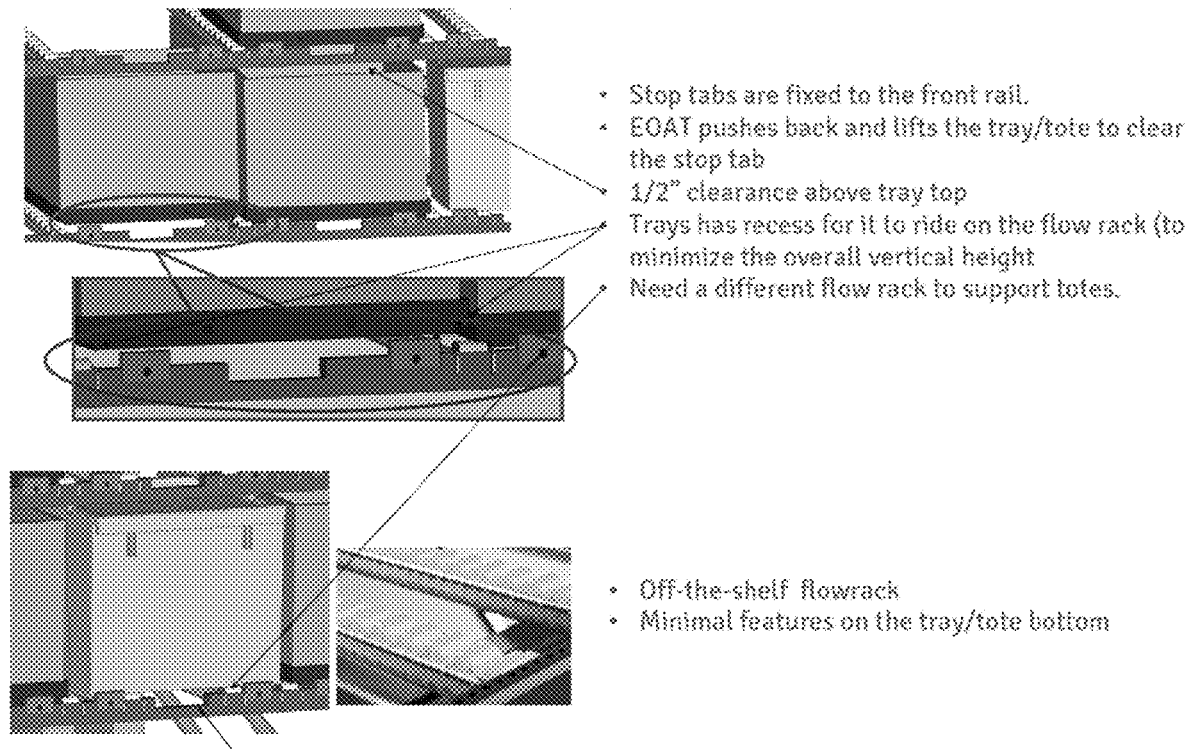
FIGS. 7A-B depict alternative shelf embodiment pursuant to the invention.
Figure 7B:
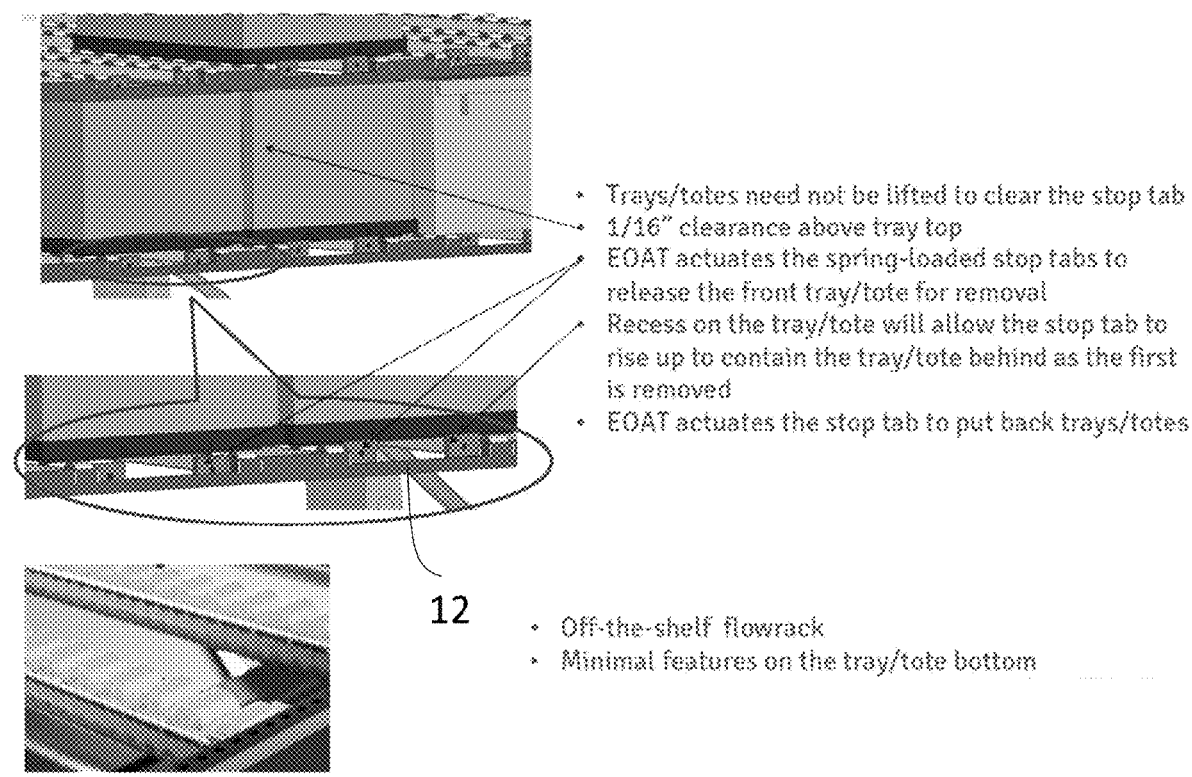

Several alternative shelf 12 concepts are shown in FIGS. 7A-B. The embodiments shown in FIGS. 7A-B are designed to work with gravity-assisted flow racks.

In the various depicted embodiments, a benefit of system which includes the moveable frame 20, also referred to as the roboframe is that it can reliably process, place, and pick containers in a technically challenging environment. For example, the roboframe compensates for uneven floors, misaligned racks, and other environmental issues. The roboframe and devices attached to it include onboard sensors to adjust the operation of the devices. Therefore, the use of the roboframe does not require a retrofit of the warehouse, nor does it require extensive repairs to a warehouse.

System Overview

Figure 8:
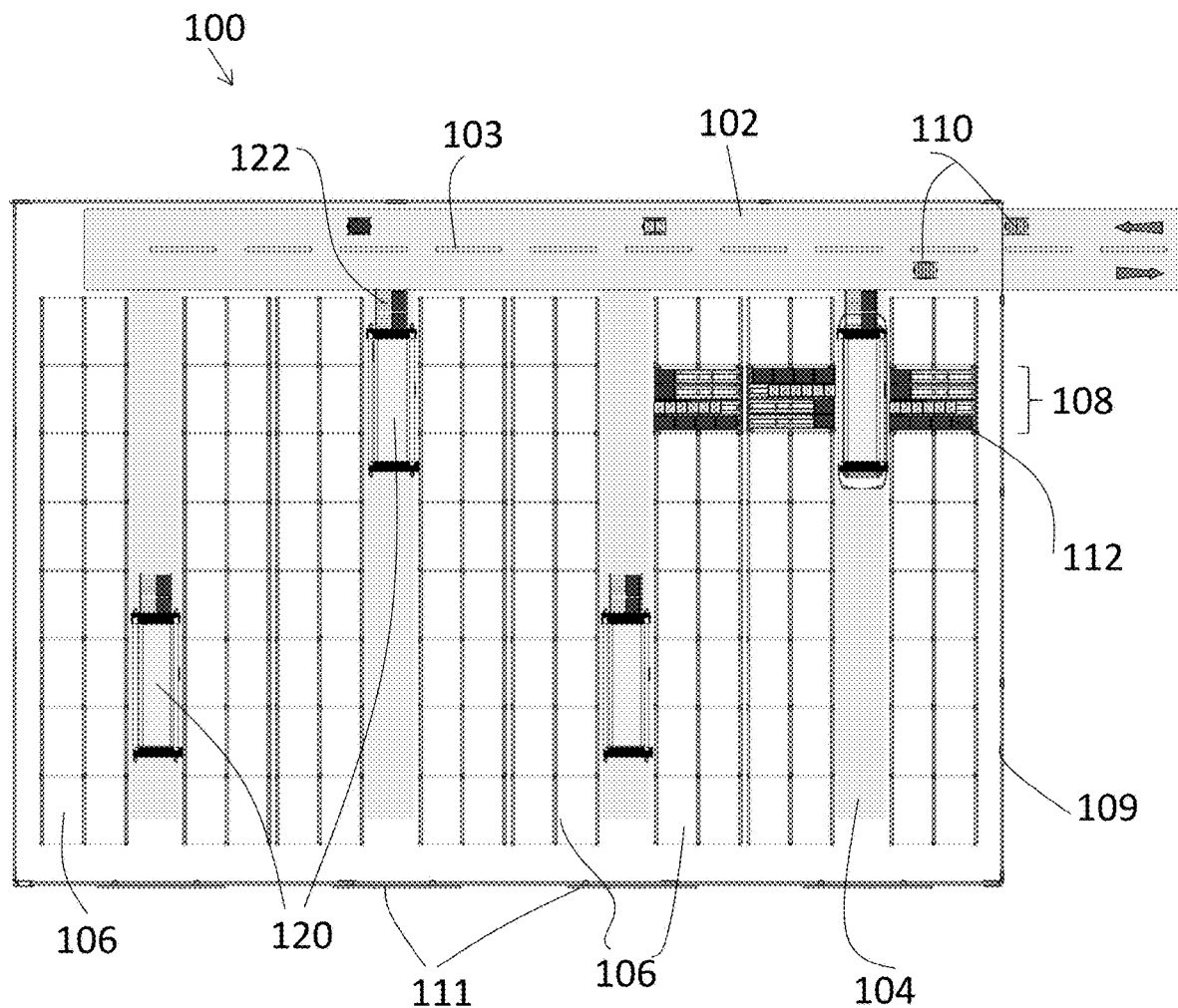
FIG. 8 depicts a schematic overview of an embodiment of the system as deployed in a facility.

Turning to FIG. 8 depicted therein is a top-down schematic overview of a facility which uses an embodiment of the system. The facility 100 is shown as using a larger aisle 102 and a series of smaller aisles 104. The larger aisle 102 facilitates movement in two directions by mobile robots 110. As will be discussed in detail below, each mobile robot 110 is equipped with a platform for transporting of bins, trays, carts, racks, and other product payload containers.

The larger aisle 102 acts a type of a mobile robot 110 thoroughfare with markings 103, both visible and invisible, designed to guide the mobile robots 110 and to assist the mobile robot 110 sensors in determining each robot's location within the premises 100.

The narrower aisles 104 separate shelving units or racks 106. FIG. 8 depicts the shelving units 106 predominantly as empty, but that is only for purposes of clarity of the figure. One region 108 of the shelving spaces is shown as filled with containers 112 of various sizes.

The narrower aisles 104 are used by roboframes 120, which will be described in detail herein. Each roboframe 120 moves in an aisle 104 to reach a particular storage location within a rack 106. Each roboframe includes an area 122 where a mobile robot 110 can deposit its payload. The roboframe, using components described below, interacts with individual racks 106 to facilitate movement of product from each rack 106 to a roboframe 120 which is then received by a mobile robot 110 for further delivery or processing. Analogously, the roboframe 120 allows for movement of product from a mobile robot 110 to a roboframe 120 and then to a specific location on a rack 106.

While in FIG. 8, each narrow aisle 104 is shown as occupied by a roboframe 120, in one embodiment, a single roboframe 120 interacts with multiple aisles 104.

The facility 100 also includes a guard 109 to prevent unauthorized entry to the area occupied by roboframes 120 and mobile robots 110. This guard 109 ensures that the autonomous systems can operate presuming that unauthorized persons will not enter the area. This increases the throughput of the system and allows the various components to eliminate sensors which would otherwise be needed to detect personnel and stop the autonomous components to prevent collisions. The guard 109 includes openings to allow mobile robots to pass through the perimeter, and one or more portals 111 to allow the roboframes 120 to enter the aisles 104.

As shown in FIG. 8, the mobile robots 110 transport product containers between roboframes 120 and with external product storage points. The products are stored in totes, as well as bins, and trays. Each container system employs computer-readable identifiers to allow for real-time tracking of product locations. In one embodiment, the mobile robots 110 include a scale which allows for cross-checking of whether or not the expected product weight has been met.

As will be described fully below, the shelving or racks 106 used by the system are low cost, have few components (none of which are powered) and can be adjusted to various heights. The racks 106 can be expanded as needed and reconfigured to carry product containers 112 of various shapes and sizes.

Roboframe and Rack Details

Figure 9:
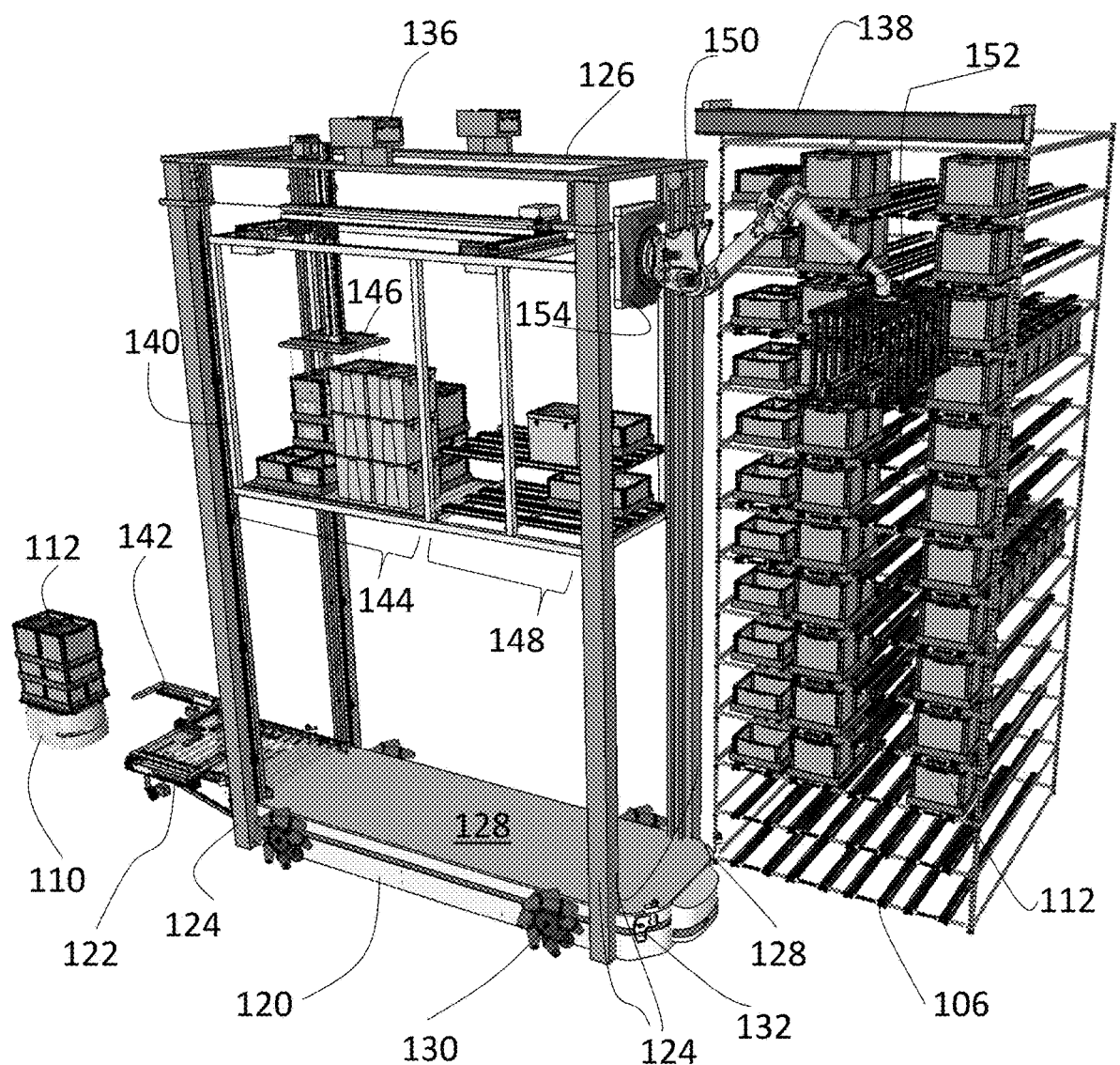
FIG. 9 depicts an overview of the primary elements of one embodiment of the system.

Turning to FIG. 9, shown therein are the details of the roboframe 120 and rack 106 and containers 112, shown in FIG. 8. While a single rack 106 is shown in FIG. 9, as can be appreciated form the schematic overview of FIG. 8, the system is designed to operate with many racks connected together, and with the roboframe 120 surrounded on both sides by arrays of racks 106. Also visible in FIG. 9 is the mobile robot 110, as it travels to the roboframe 120.

Turning first to the roboframe 120, the roboframe 120 is built from several vertical members 124 and a pair of top horizontally extending members 126. The vertical members 124 are attached to a mobile base 128, which includes wheels 130 and sensors 132 at each corner of the base 128, in one embodiment. The sensors include lidar, RF-tag readers, and the like. The sensors 132 also include a warning light, a buzzer, or other indicator, to warn of expected movement of the roboframe 120. While the sensors are placed on corners of the roboframe 120, as shown in FIG. 9, the roboframe base 128 is not exactly rectangular, with most corners having a rounded feature to facilitate turning of the roboframe 120. In one embodiment, additional sensors are located in other components of the roboframe 120, such as encoders in the wheels, which assist the roboframe in determining its relative location.

The wheels 130 comprise an irregular shape with compressible features to prevent slippage of the roboframe 120 while it is loaded with product. The wheels 130 are designed for travel along a relatively flat surface, as may be found in a distribution center. In one embodiment, a mecanum all wheel drive mechanism is used, which allows the wheels to move in any direction. The wheels are highly precise and the location of the roboframe 120 is determined using steering accuracy, with no floor-based guidance systems required, in one embodiment. The wheels provide sufficient padding to prevent transferring force to the guide rail 138.

In one embodiment, the roboframe 120 is thethered to a power source, such as a buss bar or umbilical. Communications between the roboframe 120 and a central operations system is accomplished using wireless communications.

The top horizontal members 126 of the roboframe also include guide stabilizers 136, which engage with guiderails 138 found near or on the top of the rack 106. The guide stabilizers 136 use a quick connect system to engage with the guide rails 138. In one embodiment, the guide rails 138 further comprise a pair of conductors so as to provide power to the roboframe 120 components. The guide stabilizers 136 include corresponding conductors to make contact with the guide rail 138 energized conductors. The guide rail 138 in another embodiment includes an induction coil to transfer energy to the guide stabilizers 136 without direct physical connection between the two components.

In operation, the roboframe 120 travels to a rack 106 location, the clamp guide stabilizers 136 engages with the guide rail 138, the roboframe 120 performs its functions as described below, and the clamp guide stabilizers 136 release. The roboframe 120 then travels to the next location. In one embodiment, the rail 138 is mounted directly to a wall or other physical component. The design of the rail 138 is such that the roboframe 120 can be deployed even if there no racks for interaction, such as at the end of an aisle or in a stand-by area. The design is such that rails 138 may be daisy chaned in order to get continuous support and power transfer down the length of the facility aisle.

The mobile base 128 includes an area 122 dedicated to interactions with the mobile robot 110. In the embodiment shown in FIGS. 8 and 9 the area 122 comprises rollers where mobile robots 110 can retrieve or deposit payloads 112. During the time a mobile robot 110 interacts with the area 122, an engagement arm 142 holds the mobile robot 110 in place. When depositing payloads 112, the mobile robot 110 engages its conveyor to move the payload from the mobile robot 110 to the area 122. The area 122 includes multi-directional conveyors, such as rollers, balls, or the like. The area 122 conveyor shifts the payload to the left and clearing a portion of the area 122 for a different payload which is to ready to be picked up. When the mobile robot 110 is being provided the payload 112, the area 122 conveyors move a payload stack to the mobile robot 110 held in place by the engagement arm 142.

A platform 140 moves along any vertical position of the vertical members 124.

Each corner of the platform 140 engages with a corresponding vertical member 124. In one embodiment, the engagement mechanism comprises a rail with corresponding wheels to engage the rail. In another embodiment, each corner uses a pair of ratchet wheels which engage one another and are locked in place with a pawl. In yet another embodiment, a twisting type mechanism is used.

While in one embodiment each corner includes a powered mechanism to support movement, in another embodiment, only a pair of opposing corners of the platform 140 include active movement mechanisms. In this embodiment, the remaining corners act to balance the platform 140.

In every embodiment, the platform 140 is maintained as substantially parallel to the top horizontal members 126.

The platform is divided into several logical areas. In one embodiment, the part of the platform closest to the mobile robot area 122 is the stack buffer 144. Items in the stack buffer 144 are manipulated by the gantry 146, which moves up and down within the moving platform 140, picking payloads up from one end of the platform and moving the payloads to other parts of the platform, as well as stacking the payloads one on top of another.

The gantry 146 includes a hook-based mechanism to engage with corners of the payload containers, in one embodiment. In another embodiment, the gantry 146 also includes an electromagnet.

The gantry 146 moves the payload containers to the part 148 of the platform 140 which is furthest away from the mobile robot area 122. That part 148 of the platform is where the robotic arm 150 interacts with the payloads. The robotic arm 150 retrieves containers from its area 148, loads them to the robotic end of arm tool 152 and transfers them to or from the rack 106. The end of arm tool 152 is discussed in detail below.

The platform 140 moves with the robotic arm 150 and its primary responsibility is the creation of stacks to be loaded by the end of arm tool on the robotic arm 150. Stacks of payloads are exchanged with the mobile robot while the platform 140 is lowered to the mobile base 128 and the mobile robot 110 is docked with the roboframe 120. In one embodiment, the maximum weight per stack is 100 to 500 pounds.

The robotic arm 150 includes two joints capable of rotational motion and a wrist joint which controls the end of arm tool 152.

In one embodiment, the robotic arm 150 is mounted at a fixed base 154 on the platform 140. In another embodiment, the robotic arm 150 base 154 can move up and down the sides of the platform 140. In this embodiment, the joints on the robotic arm do not require the same degree of freedom of movement as on the embodiment where the robotic arm 150 is fixed in place.

A robotic arm 150 mounted on the platform 140 includes sensors, such as cameras mounted on its wrist and end of arm tool. The robotic arm 150 uses the sensors to determine when to transfer payloads from the platform 140 area 148 to the end of arm tool 152. The robotic arm 150 has sufficient freedom of movement in its joints to reach up to four columns of product and process both sides of the narrow aisle 104 shown in FIG. 8.

In one embodiment, the maximum weight of a payload, such as a tray or a bin is 50 pounds, which is dictated by the carrying capacity of the platform 140, gantry 146, and robotic arm 150. As the robotic arm 150 must accommodate not only a payload, but also its sophisticated end of arm tool 152, its carrying limit is the determining factor for total system capacity in most embodiments.

Having access to both sides of an aisle, the robotic arm 150 can access up to 640 trays in one configuration. In operation, the payloads the robotic arm 150 requires are arranged by the gantry 146 in the robotic arm area 148. 90% of payload containers that are needed are found in the robotic arm area 148. The few containers that are not in an expected location are moved to the area 148 by the gantry 146.

In many circumstances, when the robotic arm 150 is retrieving containers from the rack 106, the items are found in the front of the rack 106. However, the robotic arm will use a set down process and place item in its area 148 from the rack 106 when the robotic arm must retrieve an item from the back of the shelf on a rack 106. In this set down process, the gantry moves items from the arm area 148 to the buffer area 144, freeing up space for the robotic arm to transfer payloads from the rack 106.

In one embodiment, the cycle times for the system are as follows. 15 seconds to pick a tray from the stack found in the robotic arm area 148, transfer the tray to the robotic arm 150 end of arm tool 152, and transfer the item to the rack 106. Similarly, the robotic arm 150 requires 15 seconds to pick a tray from the rack 106 transfer to the end of arm tool 152, and move to the stack of items in the area 148.

End of Arm Tool

Figure 10:
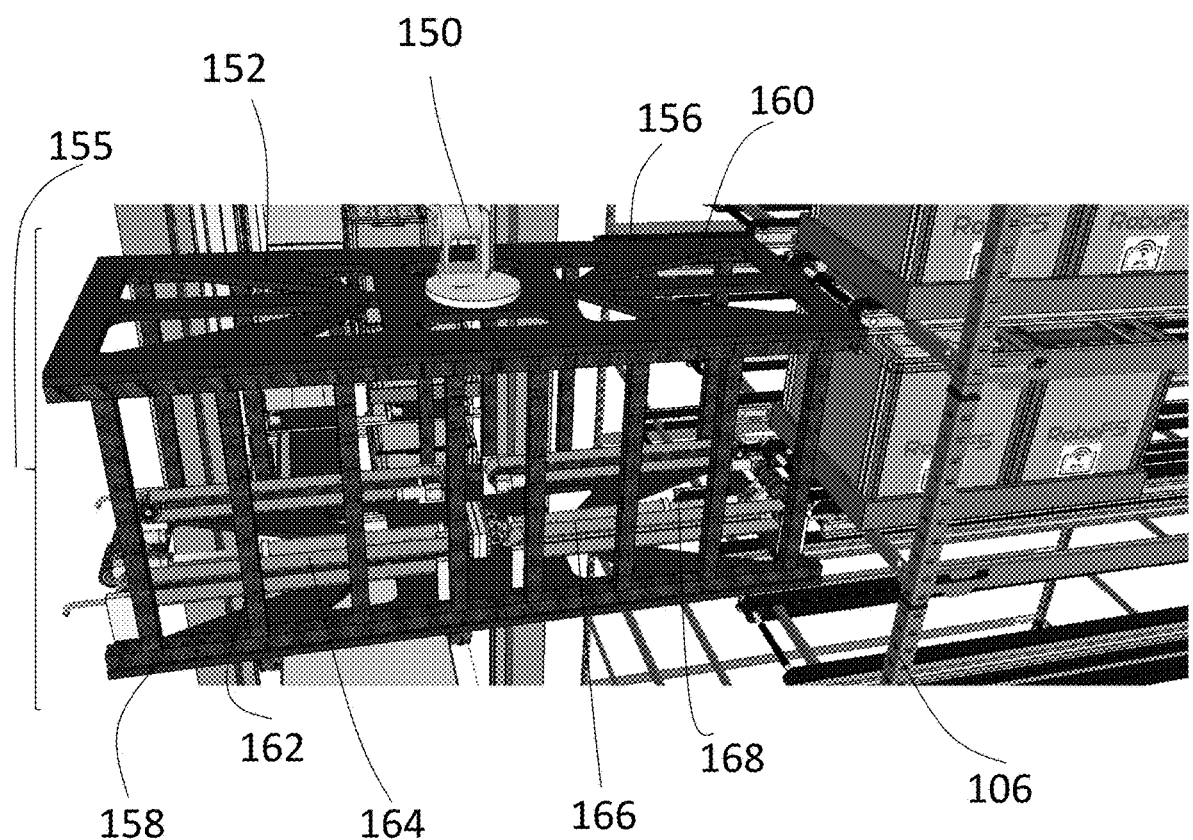
FIG. 10 depicts an overview of a component of one embodiment of the system.

The interaction of the end of arm tool 152 and the rack 106 is shown in FIG. 10. The end of arm tool 152 is mounted to the wrist of the robot 150. The end of arm tool 152 comprises a cage like structure 155 with top 156 and bottom 158 substrates. While the top 156 and bottom 158 substrates are substantially identical in one embodiment, in another embodiment, the substrates 156, 158 have different configurations. Each substrate also includes weight saving openings 160. However, the substrates 156, 158 contain sufficiently rigid materials to prevent deformation of the cage 155.

Similarly to the substrates 156, 158, the cage 155 sides 162 comprise as little material as possible, while ensuring structural stability for the cage 155. As is shown in detail in the remaining figures, the cage 155 encloses two conveyors 164, 166 which are independently operated, in one embodiment. The conveyors 164, 166 transfer payloads from the end of arm tool 152 back to the platform 140 described above, or to the rack 106.

The conveyors 164, 166 are powered by a mechanism 168, such as a motor connected to a differential which in turn transfers motion to the wheels of each conveyor 164, 166.

Overall, the end of arm tool has a simple design with a minimal number of powered active components. In one embodiment, only the mechanism 168 for the conveyors 164, 166 is a powered component, the remaining elements being passive.

The end of arm tool with wide conveyors and other features described below, provides a large tolerance for misalignment. Therefore, the robotic arm 150 does not need to move the end of arm tool 152 with extreme precision.

Figure 11:
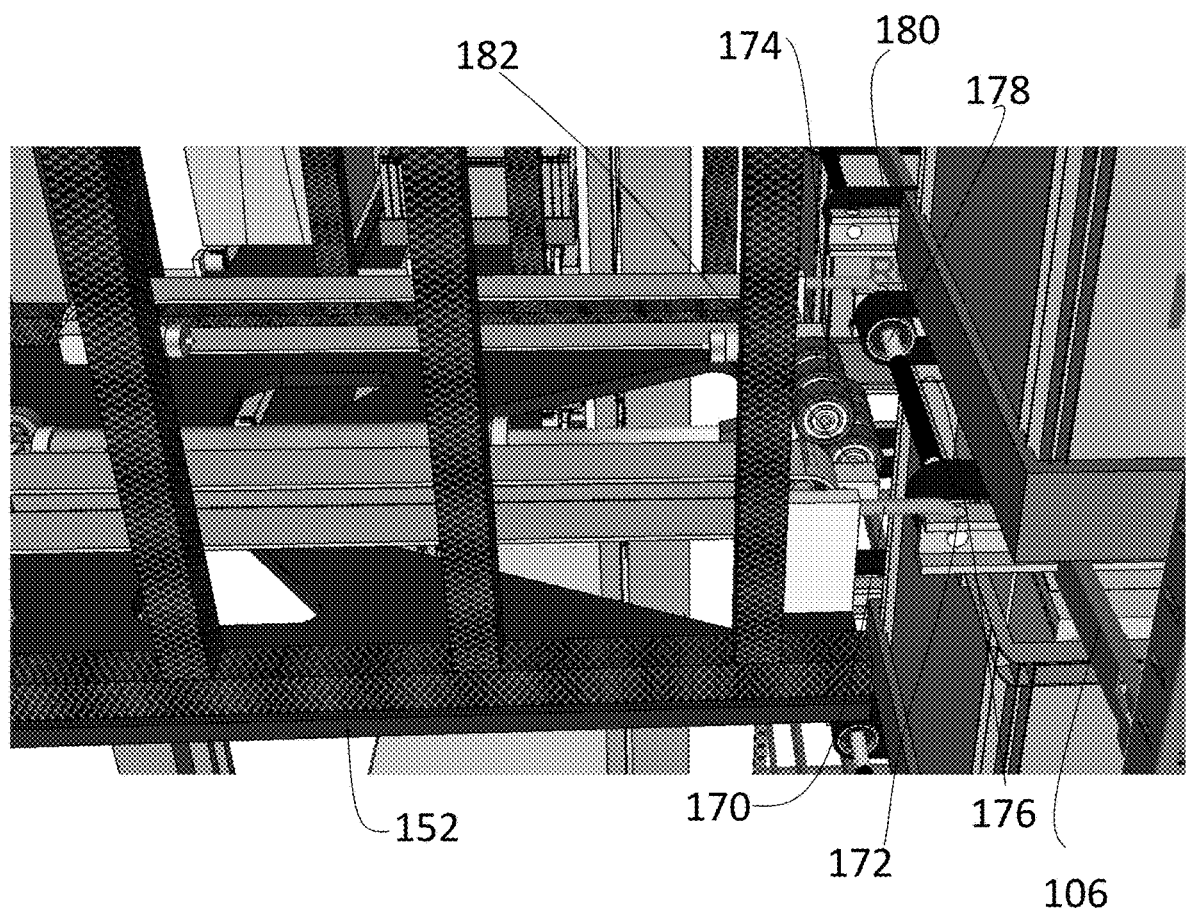
FIG. 11 depicts a detailed view of joining of components in one embodiment of the system.

The details of the interaction of the end of arm tool 152 and a rack 106 are shown in FIG. 11. The end of arm tool 152 includes hooks 170 which engage with apertures 172 on each shelf comprising the rack 106. During alignment of the end of arm tool 152 with the rack 106, the hooks 170 engage the sides of the apertures, which include profiles to guide the hooks 170 into proper alignment with the apertures 172.

In one embodiment, a low voltage continuity sensor determines once the hooks 170 have made contact with the rack 106 apertures 172. In another embodiment, the end of arm tool 152 sensors, such as a camera, determine when the end of arm tool 152 has been aligned with the rack 106.

The end of arm tool 152 includes an array of six drive wheels 174, which engage with a drive area 176 on an axle 178 of a shelf conveyor 180. The wheels 174 transfer motion to the shelf moving the shelf conveyor 180 in either direction. The motion of the wheels 174 is created by a friction drive motor 182 mounted on the end of arm tool 152.

Inasmuch as the power transfer mechanism uses an array of six wheels 174, and the six wheels 174 engage a wide friction area 176, the two components of the system do not need to be exactly aligned. Further, a space between the conveyor on the end of arm tool 152 and the shelf conveyor 180 is permissible, so long as the space is not large enough to allow a payload to become stuck between the two conveyors.

Figure 12:
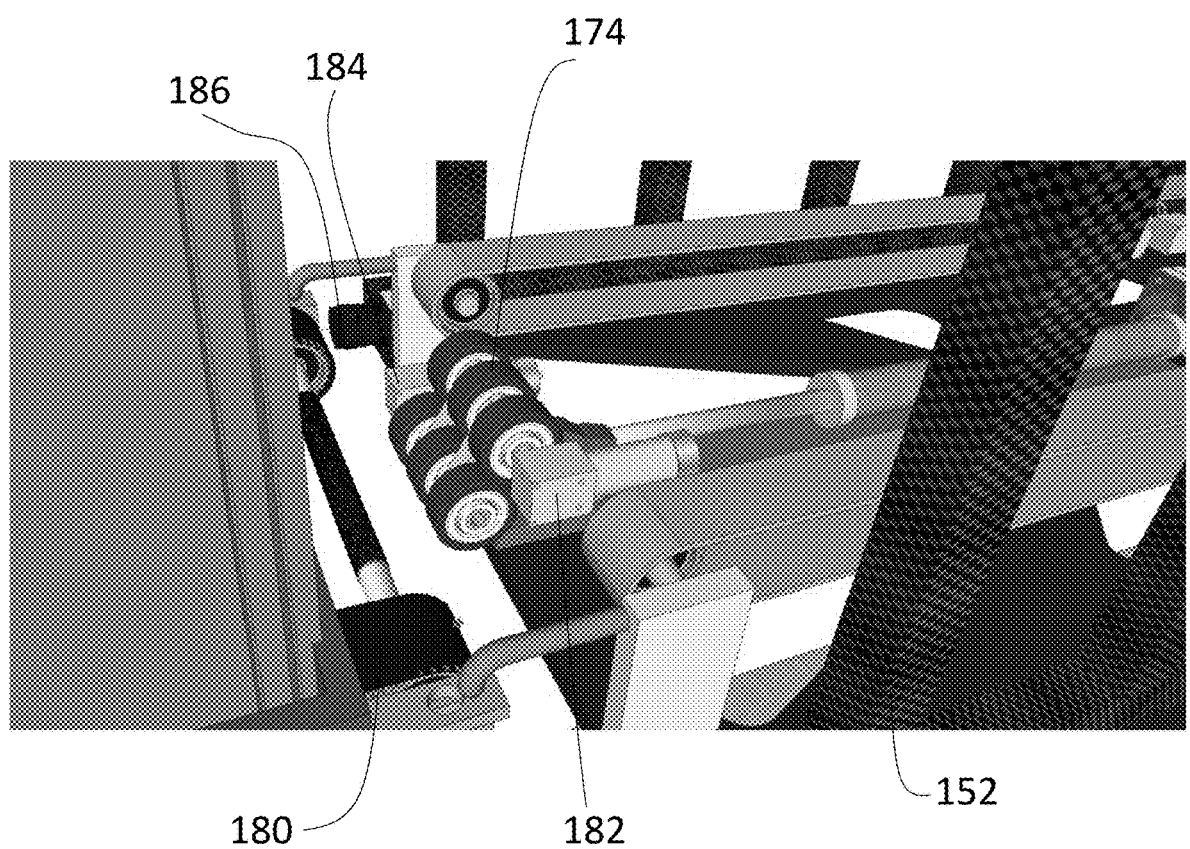
FIG. 12 depicts another view of joining of components in one embodiment of the system.

Another view of the six wheel 174 assembly is depicted in FIG. 12. As shown in that embodiment, the six wheel assembly 174 includes a top motor 182 and a bottom motor 184. In other embodiments, not all wheels a powered by a motor, with only a single source of movement used.

As can be appreciated from FIGS. 11 and 12, the rack 106 includes no powered components. Instead, the shelf conveyor 180 is entirely passive with all motion of that shelf being the responsibility of the end of arm tool 152.

As shown in FIG. 12, one corner of the end of arm tool 152 includes a camera 186. In other embodiments, not shown, additional sensors are mounted to the end of arm tool. The camera 186 is used to align the end of arm tool with the rack 106.

While the discussion above involved the interaction between the end of arm tool 152 and the rack 106, analogous structures are found on the platform 140 and so the end of arm tool 152 engages with the platform 140 in a similar fashion.

In one embodiment, the end of arm tool includes identical hooks 170 and wheel 174 assemblies on each side of the end of arm tool so as to allow interaction of the end of arm tool with either side of the rack 106 or moving platform 140.

In use, the end of arm tool can independently interact with up to two sets of containers at a time, as the end of arm tool has two independent conveyors 164, 166 (shown in FIG. 10). An end of arm tool loaded with one payload, can travel to a shelf, pick up another container from a shelf, rotate the arm tool by 180 degrees, and then put the second container on the same shelf. In this way, the end of arm tool can replace containers with only one full motion of the robotic arm.

Similarly, the robotic arm can swap containers and reverse their order on the shelf. In this process, the robotic arm starts with an empty end of arm tool, loads a first container, rotates by 180 degrees the tool to the empty side, loads a second container, rotates the tool again, then returns the first container to the shelf, followed by the second container. In this process the robotic arm can reverse the order of items on the rack without using any intermediate storage, such as the platform 140.

Further, the robotic arm can swap containers across aisles by picking a payload from one side and a second side of the aisle, then changing the container's positions.

The benefits of the end of arm tool arrangement include a decrease in the stacking and de-stacking of product containers on buffer areas of the platform and a decrease in the operations required by the gantry tool.

Rack Overview

Figure 13:
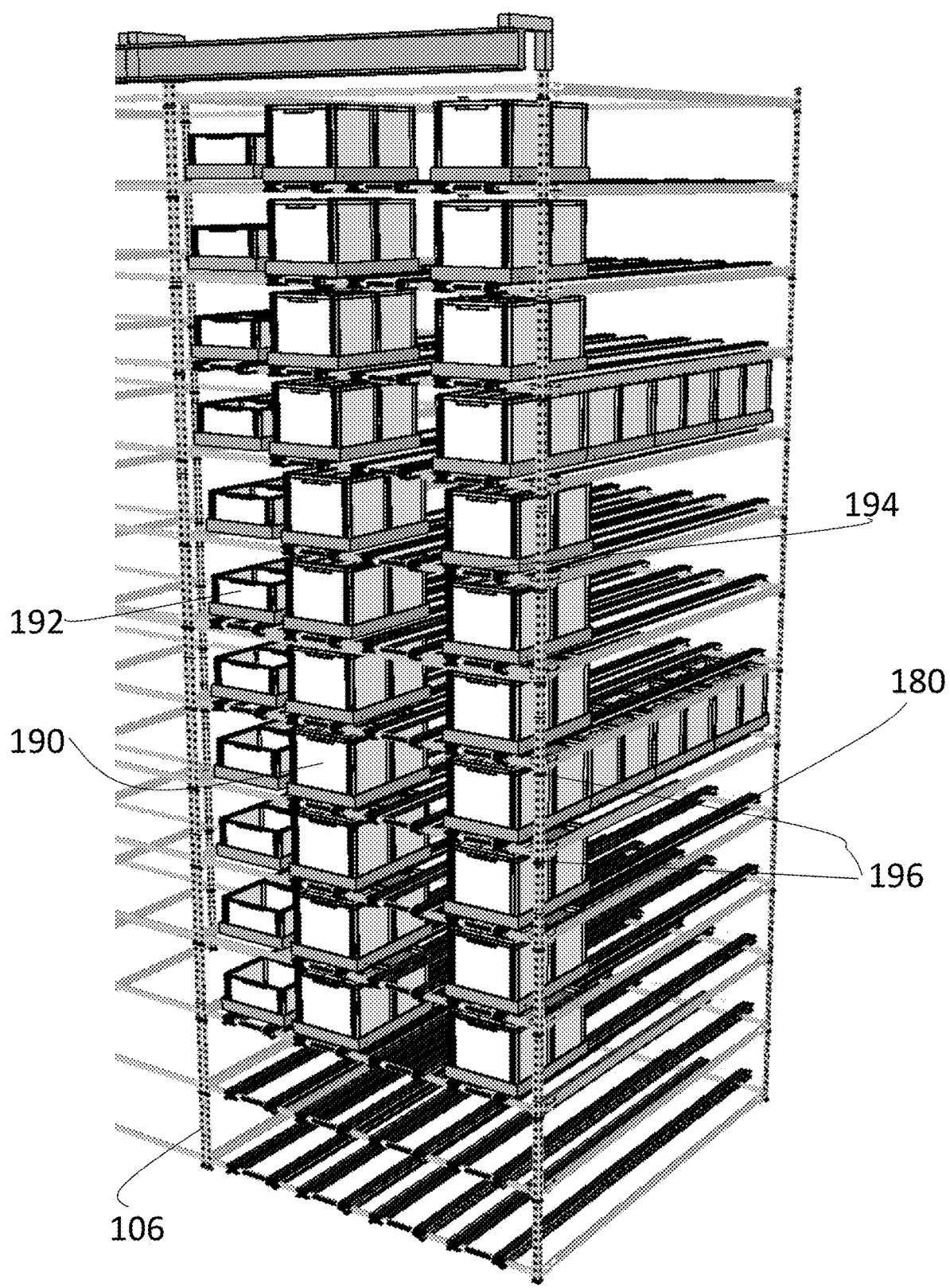
FIG. 13 depicts an overview of another component of one embodiment of the system.

An overview of the rack 106 pursuant to one embodiment of the invention is shown in FIG. 13. The rack 106 is designed with shelves for totes 190 and trays 192. Each rack 106 shelf has a front 194 which is the only point at which the roboframe interacts with the rack 106. The frame includes marks 196 to assist in alignment of the end of arm tool, which is equipped with a camera.

Shelves which comprise the rack 106 are individually serviceable and replaceable. The shelves conveyors 180 do not have powered components, with all the motion being originated with the end of arm tool. The shelves are adjustable for different container heights, with the largest containers being reserved for the top-most shelf.

Each shelf conveyor 180 includes a frictional engagement surface on the side facing the payloads to ensure that the payloads do not shift during storage. The reverse side of the conveyor 180 includes a low friction strip. This allows the conveyor 180 to move up to several hundred pounds of payloads that are located on the shelf.

Robotic Arm Operation

Figure 14:
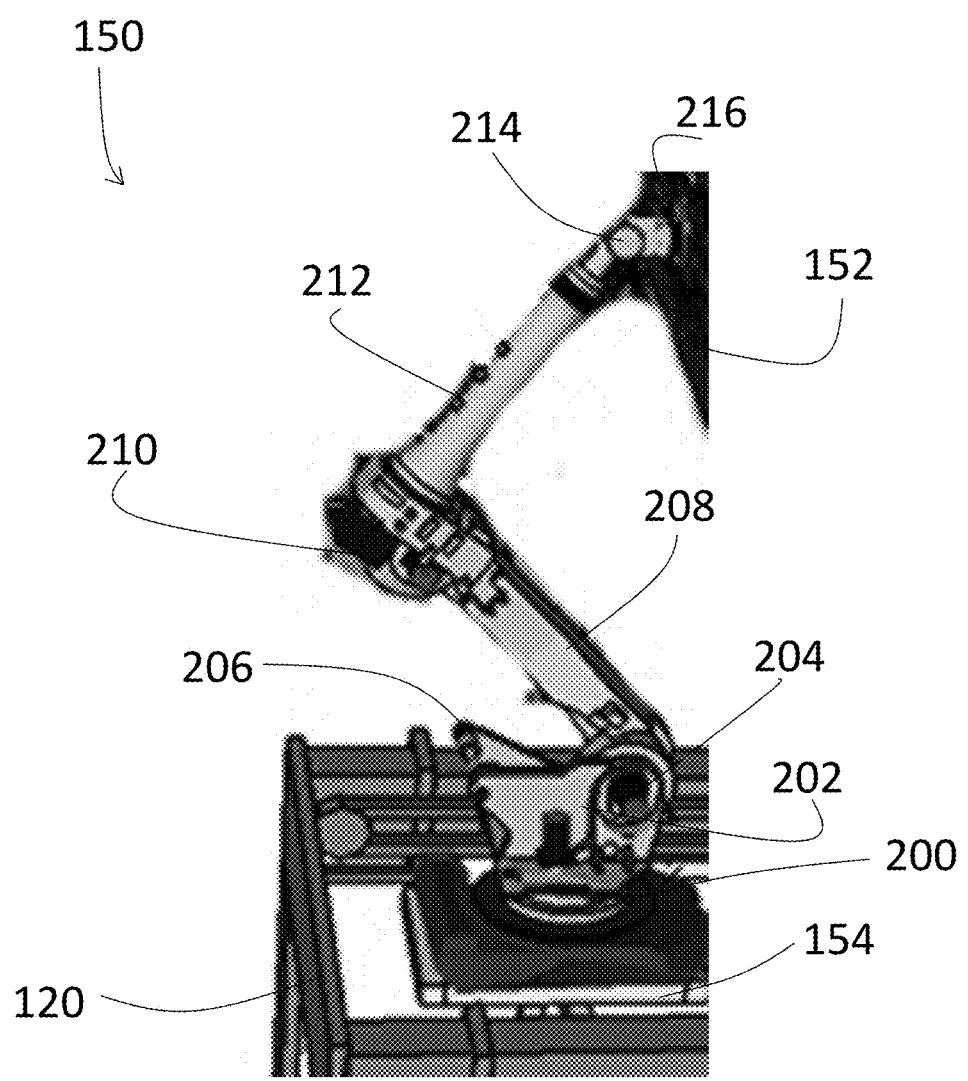
FIG. 14 depicts an overview of another component of one embodiment of the system.

The details of the operation of the robotic arm 150 are shown in FIG. 14. As described above, the robotic arm 150 is mounted on a platform 154, attached to the roboframe 120.

As shown in the embodiment of FIG. 14, the robotic arm 150 comprises a stationary base 154 with a rotating base plate 200 installed thereon. The base plate 200 allows the robotic arm 150 to extend from one aisle to the other aisle without fully extending all the joints of the robotic arm. In a fully-extended configuration, the maximum weight which can be supported by the joints decreases. During movement of the roboframe, the robotic arm 150 is placed in an extended position substantially parallel with the roboframe. In this configuration, pressure on the arm joints is minimized. Further, the end of arm tool is aligned so as to not extend beyond the sides of the roboframe 120.

Attached to the rotating base plate 200 is the arm base 202 with counterweights 206. On the opposing end of the arm base 202 is a revolute joint 204, which controls the movement of the first link 208. The revolute joint 204 allows the arm to move closer or away from the roboframe 120.

The first link 208 has a substantially rectangular profile, in one embodiment. In another embodiment, the first link 208 has an I-beam profile.

The opposing end of the first link 208 is a second revolute joint 210. The second revolute joint 210 connects the first link 208 to the second link 212.

The second link 212 is substantially cylindrical, in the depicted embodiment. The second link 212 includes a number of sensors. While the shapes of the first link and second link are depicted as rectangular and cylindrical respectively, a number of shapes for the links is envisioned in other embodiments, not shown.

The end of the second link 212 which is opposite of the second revolute joint 210 ends in a wrist joint 214. The wrist joint 214 allows for rotation of the end of arm mounting plate 216 in any direction. The end of arm tool 152 (shown only partially in FIG. 14) is attached to the end of arm mounting plate 216.

This arrangement allows the robotic arm 150 to move in any number of directions, and reach either aisle 104, as shown in FIG. 8.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A method for movement of products, the method comprising:
   a) providing a facility wherein said facility contains warehouse shelves, each shelf having a front and wherein containers of products are stored on each shelf;
   b) providing at least one moveable frame which travels to each shelf front to access the containers stored on said shelf wherein said moveable frame includes a repositionable storage ledge;
   c) providing a lifting device attached to said moveable frame;
   d) providing a gripping device attached to said moveable frame;
   e) providing at least one mobile robot;
   f) moving said moveable frame to a location of a specific shelf; and
   g) positioning said storage ledge in vertical position required to access said specific shelf;
   wherein said lifting device and gripping device access containers on the storage ledge of said moveable frame and said specific shelf thereby transferring product containers from the specific shelf to said storage ledge and transferring product containers from the storage ledge to said specific shelf.

2. The method of claim 1 further comprising:
   h) moving said moveable frame to a new shelf; and
   i) repeating step f.

3. The method of claim 1 wherein said facility includes a guard to prevent unauthorized access to areas occupied by mobile robots and moveable frames.

4. The method of claim 1 wherein said facility includes two or more moveable frames and said at least one mobile robot transfers products between said two or more moveable frames.

5. The method of claim 1 wherein said storage ledge is organized into multiple logical areas.

6. The method of claim 5 wherein said gripping device comprises a gantry which moves product containers between said multiple logical areas of said storage ledge.

7. The method of claim 5 wherein said gantry moves products to a mobile robot.

8. The method of claim 1 wherein said lifting device comprises a robotic arm.

9. The method of claim 8 wherein said robotic arm comprises an end of arm tool wherein said end of arm tool allows the robotic arm to interact with product containers.

10. The method of claim 8 wherein said end of arm tool further includes a power transfer mechanism.

11. The method of claim 10 wherein said facility warehouse shelves do not include powered components and are not active unless said end of arm tool power transfer mechanism engages with at least one shelf.

12. The method of claim 1 wherein said at least one moveable frame comprises vertical members, a pair of horizontally extending members attached at a top of end of said vertical members wherein opposing bottom end of vertical members are attached to a mobile base; wherein said moveable frame further includes a connection to a power source.

13. The method of claim 12 wherein said mobile base comprises wheels and sensors at each corner of said mobile base and wherein said mobile base is shaped as a rectangle with rounded corners.

14. The method of claim 13 wherein sensors comprise lidar and RF-tag reader.

15. The method of claim 13 wherein said mobile base further includes an indicator of movement.

16. The method of claim 1 further comprising:
   h) lowering said storage ledge and docking said mobile robot to the lowered storage ledge; and
   i) transferring contents of said storage ledge to said mobile robot.

17. The method of claim 16 further comprising:
   j) moving said moveable frame to a new shelf; and
   k) repeating steps f to i.

18. The method of claim 16 wherein docking of said mobile robot to said moveable frame comprises engaging said mobile robot depositing payload on a frame surface by transferring same using a conveyor from the moveable frame to said mobile robot.

19. The method of claim 16 wherein said facility includes at least one larger aisle and at least one smaller aisle.

20. The method of claim 19 wherein said mobile robot traverses said larger aisle and wherein said moveable frame traverses said smaller aisle.

* * * * *